(12) United States Patent
Winnie

(10) Patent No.: US 9,016,096 B2
(45) Date of Patent: Apr. 28, 2015

(54) LOCKING LUG NUT SYSTEM

(71) Applicant: Dennis Winnie, Taylor, MI (US)

(72) Inventor: Dennis Winnie, Taylor, MI (US)

( * ) Notice: Subject to any disclaimer, the term of this patent is extended or adjusted under 35 U.S.C. 154(b) by 0 days.

(21) Appl. No.: 14/132,769

(22) Filed: Dec. 18, 2013

(65) Prior Publication Data
US 2014/0169910 A1 Jun. 19, 2014

Related U.S. Application Data

(60) Provisional application No. 61/738,826, filed on Dec. 18, 2012.

(51) Int. Cl.
*F16B 41/00* (2006.01)
*B60R 25/00* (2013.01)
*F16B 39/12* (2006.01)

(52) U.S. Cl.
CPC ............... *F16B 39/12* (2013.01); *F16B 41/005* (2013.01)

(58) Field of Classification Search
USPC ........... 70/181, 182, 225, 229, 230, 232, 259, 70/260
See application file for complete search history.

(56) References Cited

U.S. PATENT DOCUMENTS

| | | | |
|---|---|---|---|
| 1,751,779 A | 3/1930 | Senden | 70/232 |
| 1,912,872 A | 6/1933 | Trautner | 70/260 |
| 2,270,918 A | 1/1942 | Ash | 301/13.1 |
| 2,316,695 A | 4/1943 | Jaffa | 411/337 |
| 2,857,205 A | 10/1958 | Stricklen | 301/35.624 |
| 3,222,976 A | 12/1965 | Holman | 411/337 |
| 3,298,272 A | 1/1967 | Henderson | 411/373 |
| 3,423,971 A | 1/1969 | Brunelli | 70/231 |
| 3,540,245 A | 11/1970 | Pope | 70/231 |
| 3,696,646 A | 10/1972 | Loscalzo | 70/1.5 |
| 4,037,515 A | 7/1977 | Kesselman | 411/3 |
| 4,057,985 A * | 11/1977 | Stahl | 70/231 |
| 4,211,128 A | 7/1980 | Plumer | 81/436 |
| 4,280,348 A | 7/1981 | Teston | 70/166 |
| 4,302,137 A | 11/1981 | Hart | 411/432 |
| 4,324,516 A | 4/1982 | Sain et al. | 411/5 |
| 4,521,146 A | 6/1985 | Wharton | 411/1 |
| 4,645,397 A | 2/1987 | Howe | 411/43 |
| 4,742,702 A * | 5/1988 | Swertz | 70/231 |
| 4,825,669 A | 5/1989 | Herrera | 70/163 |
| 4,869,633 A | 9/1989 | Hayashi | 411/368 |
| 4,870,842 A * | 10/1989 | Plumer | 70/232 |
| 5,037,260 A | 8/1991 | Rubin | 411/432 |
| 5,408,854 A | 4/1995 | Chiu | 70/225 |
| 5,810,532 A | 9/1998 | Huang | 411/431 |
| 6,213,361 B1 | 4/2001 | Dexel | 224/42.24 |
| 6,273,658 B1 | 8/2001 | Patterson et al. | 411/431 |
| 6,571,588 B1 * | 6/2003 | Yuen | 70/233 |
| 6,609,401 B1 | 8/2003 | Iskhakbayev | 70/225 |
| 6,695,557 B2 | 2/2004 | Hove et al. | 411/429 |
| 6,726,515 B1 * | 4/2004 | DeMange | 70/230 |
| 6,736,579 B2 | 5/2004 | Lonnqvist et al. | 411/396 |

(Continued)

FOREIGN PATENT DOCUMENTS

DE 3017879 11/1981

*Primary Examiner* — Christopher Boswell
(74) *Attorney, Agent, or Firm* — Gifford, Krass, Sprinkle, Anderson & Citkowski, P.C.; Douglas L. Wathen

(57) ABSTRACT

A locking lug nut system includes a primary locking lug nut, a secondary locking lug nut, and a key. The locking lug nuts each have non-hexagonal irregular key surfaces and the key has a non-hexagonal key element engageable with the key surface of at least one of the locking lug nuts.

14 Claims, 2 Drawing Sheets

(56) References Cited

U.S. PATENT DOCUMENTS

| | | | |
|---|---|---|---|
| 6,913,322 B1 | 7/2005 | Allen | 301/37.371 |
| 7,392,674 B1 | 7/2008 | Grote | 70/232 |
| 7,665,334 B2 * | 2/2010 | Medina | 70/57 |
| 7,673,482 B2 | 3/2010 | Bosman | 70/232 |
| 8,016,535 B1 * | 9/2011 | Roberts | 70/232 |
| 8,739,585 B2 * | 6/2014 | Sims | 70/225 |
| 2003/0140664 A1 | 7/2003 | Swertz | |
| 2004/0148985 A1 * | 8/2004 | Swanson | 70/225 |
| 2010/0178131 A1 | 7/2010 | Braithwaite | |
| 2012/0260702 A1 | 10/2012 | Jones | |

* cited by examiner

LOCKING LUG NUT SYSTEM

CROSS-REFERENCE TO RELATED APPLICATIONS

This application claims priority of U.S. Provisional Application 61/738,826 filed Dec. 18, 2012, the contents of which are incorporated herein by reference.

FIELD OF THE INVENTION

The present invention relates generally to a system for locking engagement with a threaded stud such as for anti-theft attachment of a wheel to a vehicle.

BACKGROUND OF THE INVENTION

It is a known problem that a wheel may be removed from a vehicle without authorization. A variety of anti-theft locking lug nut designs have been proposed and produced. Standard lug nuts for wheel attachment have a threaded opening for engaging a threaded stud and an inner face for engaging a wheel. The standard lug nut has a hexagonal outer surface that may be easily engaged by standard sockets and wrenches for tightening and loosening of the lug nut. However, the standardized nature of such lug nuts makes it easy for anyone to remove a wheel from a vehicle without authorization. Locking lug nuts typically have an outer surface or end face that is non-hexagonal such that the lug nut requires a specialized tool or key to loosen the lug nut. In one example, the locking lug nut has a side wall with a specialized pattern requiring a matching socket. In another example, the locking lug nut has an outer end face with a key pattern cut into the face. A key is provided that engages this irregular pattern. The key also typically has a hexagonal outer surface such that it can be engaged by a standard socket or wrench. The locking lug nut may then be tightened or loosened through use of the key. Such locking lug nuts improve the security of wheels, since it makes it more difficult for a non-authorized user to remove the locking lug nut. However, currently existing locking lug nuts can be defeated in a variety of ways. A non-authorized user may force a standardized socket onto a locking lug nut and the friction between the socket and the locking lug nut will be sufficient that the locking lug nut may be removed. Some locking lug nuts may also be removed through the use of a hammer and chisel. A locking lug nut may also be gripped with a pair of locking pliers or a specialized tool designed to clamp onto an irregular surface.

In light of the above, there is a need for improved locking lug nut systems.

SUMMARY OF THE INVENTION

The present invention provides a locking lug nut system for locking engagement with a threaded stud. The system includes a primary locking lug nut having a threaded opening for engaging the threaded stud. The primary locking lug nut has an inner face for engaging a wheel. The primary locking lug nut also has a non-hexagonal irregular key surface. A secondary locking lug nut has a threaded opening for engaging the same threaded stud. The secondary locking lug nut has an inner face for engaging the primary locking lug nut. The secondary locking lug nut also has a non-hexagonal regular key surface. A key has a non-hexagonal key element engageable with a key surface of at least one of the locking lug nuts.

In certain embodiments, each locking lug nut has an outer face and the non-hexagonal key surface of each locking nut is an irregular key pattern defined in the outer face. In some versions, the threaded opening of the primary locking lug nut extends along a lug axis and the outer face of the primary locking lug nut has a surface disposed in a plane perpendicular to the lug axis, and the key pattern is recessed into the surface.

In some versions, the key pattern of the primary locking lug nut is a first key pattern and the key pattern of the secondary locking lug nut is a second key pattern different than the first key pattern. The key element of the key is a first key element engageable with a first key pattern and the key further has a second key element engageable with the second key pattern. The key may have a first end with the first key element extending therefrom and an opposite second end with the second key element extending therefrom. The key may have an axial passage defined therethrough.

In certain embodiments, the key surface of the primary locking lug nut is a first key surface and the key surface of the secondary locking lug nut is a second key surface different than the first key surface. The key element of the key is a first key element engageable with a first key surface and the key further has a second key element engageable with a second key surface. In some versions, the key has a first end with a first key surface and an opposite second end with a second key surface.

In certain embodiments, the outer surface of the primary locking lug nut has a surface and the key pattern is recessed into the surface, and the inner face of the secondary locking lug nut has a protruding portion that extends into the key pattern of the primary locking lug nut when the secondary locking lug nut engages the primary locking lug nut.

In certain embodiments, the locking lug nuts are each generally cylindrical with a generally smooth side wall.

In certain embodiments, the threaded opening of the primary locking lug nut extends through the lug nut from the inner face to an outer face and the threaded opening of the secondary locking lug nut extends partway from the inner face to an outer face, with the outer face being closed.

In certain embodiments, the key has a hexagonal outer surface for engagement with a tool.

In certain embodiments, the secondary locking lug nut has a length from the inner face to an outer face that is greater than a length of the inner locking lug nut from the inner face to an outer face.

The present invention further provides a locking lug nut system for locking engagement with a threaded stud, including a primary locking lug nut having a threaded opening for engaging a threaded stud. The primary locking lug nut has an inner face for engaging a wheel and an opposed outer face, the outer face having a non-hexagonal irregular key pattern defined therein. A secondary lug nut has a threaded opening for engaging the same threaded stud. The secondary lug nut has an inner face for engaging the outer face of the primary locking lug nut. A key has a non-hexagonal irregular key element engageable with the key pattern of the primary locking lug nut.

In certain embodiments, the secondary lug nut has a hexagonal outer surface for engagement with a wrench or socket.

In certain embodiments, a friction-reducing element is disposed between the inner face of the secondary locking lug nut and the outer face of the primary locking lug nut. Alternatively, a friction-reducing coating is provided on one or both surfaces.

DETAILED DESCRIPTION OF THE PREFERRED EMBODIMENTS

Figure 1:
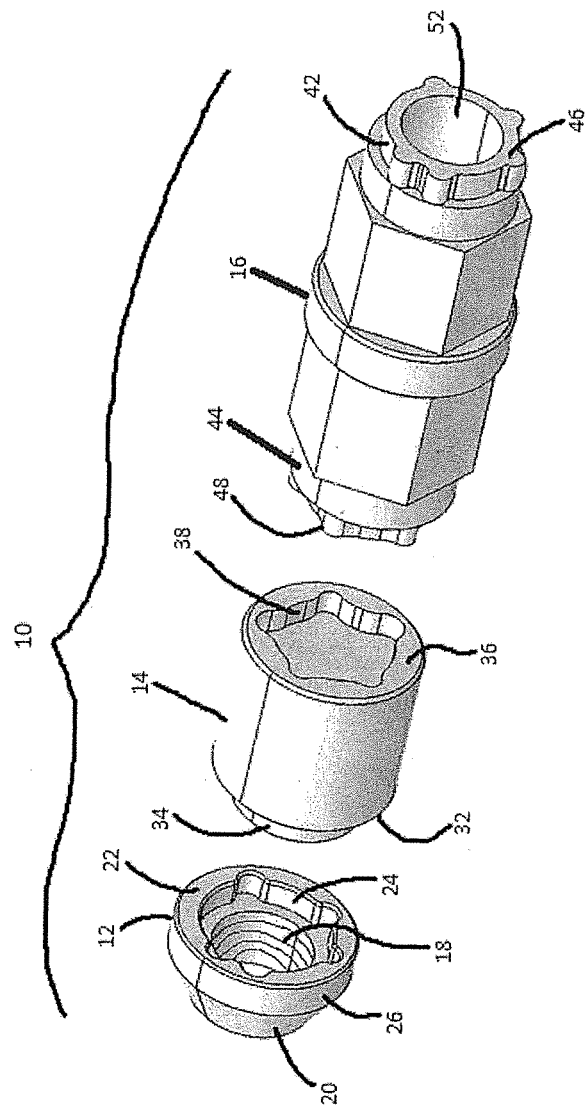
FIG. 1 is a perspective view of a locking lug nut system in accordance with an embodiment of the present invention.
Figure 2:
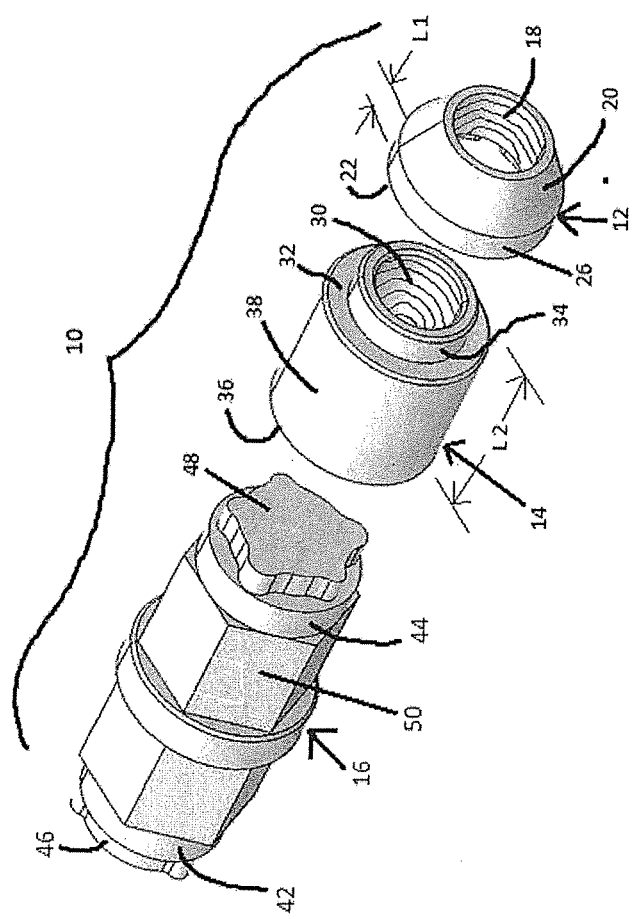
FIG. 2 is a perspective view, from an opposite direction, of the locking lug nut system of FIG. 1.

The present invention provides a locking lug nut system for locking engagement with a threaded stud. Such a system is typically used to secure a wheel to a vehicle and requires a key for removal of locking lug nuts. Referring to FIGS. 1 and 2, a first embodiment of a locking lug nut system is shown at 10. The system includes a primary locking lug nut 12, a secondary locking lug nut 14, and a key 16. The primary locking lug nut 12 has a threaded opening 18 for engaging a threaded stud. This threaded opening may be said to extend along an axial lug axis. The primary locking lug nut 12 has an inner face 20 for engaging a wheel. In the illustrated embodiment, the inner face 20 is tapered, as is typical for lug nuts for use with certain types of wheels. The inner face may alternatively be flat or be tapered at a different angle depending on the wheel and vehicle with which it is to be used. Additionally, the size and thread type of the threaded opening 18 will depend on the vehicle with which the system 10 is to be used.

The primary locking lug nut 12 has an outer face 22 that is opposed to the inner face 20 and defines the outer end of the primary locking lug nut 12. In the illustrated embodiment, the outer face includes a generally flat surface that is perpendicular to the lug axis. An irregular key pattern 24 is defined in and recessed into the face 22. The key pattern 24 may take a variety of forms. In the illustrated embodiment, the key pattern is an irregularly shaped machined recess. However, a variety of other shapes and approaches may be used. For example, the side wall 26 of the primary locking lug 12 may have a key surface defined thereon.

The secondary locking lug nut 14 has a threaded opening 30 for engaging the same threaded stud as the primary locking lug 12. The secondary locking lug has an inner face 32 for engaging the outer face 22 of the primary locking lug nut. In the illustrated embodiment, a generally cylindrical protrusion 34 extends from the inner face 32 and this protrusion extends into the recessed key pattern 24 of the primary locking lug nut 12.

The secondary locking lug nut has an outer face 36 opposed to the inner face 32 and defining the outer end of the secondary locking lug nut 14. In the illustrated embodiment, the outer face includes a flat surface that is perpendicular to the lug axis. A non-hexagonal irregular key pattern 38 is defined in and recessed into the surface 36. In the illustrated embodiment, a smooth generally cylindrical side wall 38 extends between the inner face 32 and outer face 36. As with the primary locking lug nut 12, the key pattern 38 of the secondary locking lug nut 14 is one example of a key surface. Other approaches may be used, including providing a non-hexagonal irregular key surface on the outer face or side wall.

Preferably, the key pattern 24 of the primary locking lug nut 12 is a first key pattern and the key pattern 38 of the secondary locking lug nut 14 is a second key pattern and the two key patterns are different from each other. Alternatively, the key patterns may be the same. As a further alternative, the type of key surface on the primary locking lug nut 12 and the secondary locking lug nut 14 may differ from one another.

In the illustrated embodiment, the key 16 is designed to engage the key surfaces of the primary locking lug nut 12 and secondary locking lug nut 14. The key has a first end 42 and an opposed second end 44. A first key element 46 extends from the first end 42 and is engageable with the first key pattern 24. A second key pattern 48 extends from the second end 44 and is engageable with the second key pattern 38. The key further has a hexagonal outer surface 50 that can be engaged with a standard wrench or socket. As shown in FIG. 1, the key 16 may have an axial passage 52 defined therethrough such that the key 16 fits over a threaded stud when engaging the primary locking lug nut 12. The key 16 may take other forms, such as being only single ended if the key patterns on the primary and secondary locking lug nuts are the same. Alternatively, two separate keys may be provided for two separate key patterns. Also, the key may take other forms if the key surfaces take other forms. Preferably, locking lug nut systems are sold with a plurality of different key patterns such that the owner of one set may not remove the system purchased by another owner. The number of variations will be determined by the manufacturer, and a master set of keys may be produced for authorized use.

In use, a vehicle wheel is positioned on a threaded stud and the primary locking lug nut 12 is threaded onto the threaded stud. The key 16 is used to tighten the primary locking lug nut into place. Preferably, the primary locking lug nut is tightened to a specified torque setting so as to secure the wheel in combination with several other standard lug nuts. The secondary locking lug nut 14 is then threaded onto the same threaded stud until the inner face 32 engages the outer face 22 of the primary locking lug. The key is used to tighten the secondary locking lug into place. This combination makes it significantly more difficult for a non-authorized user to remove a wheel from a vehicle. While such a user may be able to defeat the secondary locking lug nut in the ways typically used to defeat a one piece locking lug nut, the primary locking lug nut will remain in place. Additionally, the secondary locking lug nut acts as a jam but for the primary locking lug nut, ensuring that the nuts will not work themselves loose.

In the illustrated embodiment, the primary locking lug nut 12 has a length L1, defined as the distance between the inner face 20 and outer face 22, that is significantly less than the length L2 of the secondary locking lug nut 14, with L2 being defined as the distance between the inner face 32 and outer face 36. The length L1 is very small creating a thin primary locking lug nut. This causes the lug nut to be very close to or recessed into the outer surface of the vehicle wheel, making it very difficult to remove without the appropriate key 16. The length of L1 and L2 will be determined by the wheel stud (and wheel) for which the locking lug nut system is being manufactured As shown, the threaded opening 18 in the primary locking lug nut extends entirely through the lug nut 12 from the inner face 20 to the outer face 22. In the illustrated embodiment, the threaded opening 30 in the secondary locking lug nut 14 extends only partway through the lug nut 14 and the outer face 38 is closed. Alternatively, the threaded opening in the secondary locking lug nut may extend entirely therethrough.

In alternative embodiments, the secondary lug nut 14 may be non-locking in that it has a standard hexagonal outer surface. This provides increased security as compared to a standard locking lug nut since the inner primary locking lug nut 12 is still significantly more difficult to remove.

While the present invention is described for use with vehicle wheels, the system may also be used to lock other devices in which a threaded connection is made. The nuts and key may be manufactured in a variety of ways, and may be chromed or otherwise treated to provide a desirable appearance.

As will be clear to those of skill in the art, the herein described embodiments of the present invention may be altered in various ways without departing from the scope or teaching of the present invention. It is the following claims, including all equivalents, which define the scope of the present invention.

The invention claimed is:

1. A locking lug nut system for locking engagement with a threaded stud, the system comprising:
    a primary locking lug nut having a threaded opening for engaging the threaded stud, the primary locking lug nut having an inner face for engaging a wheel, the primary locking lug nut further having a non-hexagonal irregular key surface;
    a secondary locking lug nut having a threaded opening for engaging the same threaded stud, the secondary locking lug nut having an inner face for engaging the primary locking lug nut, the secondary locking lug nut further having a non-hexagonal irregular key surface; and
    a key having a non-hexagonal key element engageable with the key surface of at least one of the locking lug nuts.

2. A locking lug nut system in accordance with claim 1, wherein:
    each locking lug nut has an outer face and the non-hexagonal key surface of each locking lug nut is an irregular key pattern defined in the outer face.

3. A locking lug nut system in accordance with claim 2, wherein:
    the threaded opening in the primary locking lug nut extends along a lug axis, the outer face of the primary locking lug nut having a surface disposed in a plane perpendicular to the lug axis, and the key pattern being recessed into the surface.

4. A locking lug nut system in accordance with claim 2, wherein:
    the key pattern of the primary locking lug nut is a first key pattern and the key pattern of the secondary locking lug nut is a second key pattern different than the first key pattern; and
    the key element of the key is a first key element engageable with the first key pattern;
    the key further having a second key element engageable with the second key pattern.

5. A locking lug nut system in accordance with claim 4, wherein:
    the key has a first end with the first key element extending therefrom and an opposite second end with the second key element extending therefrom.

6. A locking lug nut system in accordance with claim 5, wherein:
    the key has an axial passage defined therethrough.

7. A locking lug nut system in accordance with claim 2, wherein:
    the outer face of the primary locking lug nut has a surface and the key pattern is recessed into the surface; and
    the inner face of the secondary locking lug nut has a protruding portion, the protruding portion extending into the key pattern of the primary locking lug nut when the secondary locking lug nut engages the primary locking lug nut.

8. A locking lug nut system in accordance with claim 1, wherein:
    the key surface of the primary locking lug nut is a first key surface and the key surface of the secondary locking lug nut is a second key surface different than the first key surface; and
    the key element of the key is a first key element engageable with the first key surface;
    the key further having a second key element engageable with the second key surface.

9. A locking lug nut system in accordance with claim 8, wherein:
    the key has a first end with the first key surface and an opposite second end with the second key surface.

10. A locking lug nut system in accordance with claim 1, wherein:
    the locking lug nuts are each generally cylindrical with a generally smooth side wall.

11. A locking lug nut system in accordance with claim 1, wherein:
    the threaded opening of the primary locking lug extends through the lug nut from the inner face to an outer face; and
    the threaded opening of the secondary locking lug nut extending partway from the inner face to an outer face, the outer face being closed.

12. A locking lug nut system in accordance with claim 1, wherein:
    the key has a hexagonal outer surface for engagement with a tool.

13. A locking lug nut system in accordance with claim 1, wherein:
    the secondary locking lug nut has a length from the inner face to an outer face that is greater than a length of the inner locking lug nut from the inner face to an outer face.

14. A locking lug nut system for locking engagement with a threaded stud, the system comprising:
    a primary locking lug nut having a threaded opening for engaging the threaded stud, the primary locking lug nut having an inner face for engaging a wheel and an opposed outer face, the outer face having a non-hexagonal irregular key pattern defined therein;
    a secondary lug nut having a threaded opening for engaging the same threaded stud, the secondary lug nut having an inner face for engaging the outer face of the primary locking lug nut; and
    a key having a non-hexagonal irregular key element engageable with the key pattern of the primary locking lug nut.

* * * * *